(12) United States Patent
Knoebel et al.

(10) Patent No.: US 10,343,637 B2
(45) Date of Patent: Jul. 9, 2019

(54) MISTAKE PROOF BRACKETS FOR INSTALLATION OF SEAT TRIM COVER AIRBAG STRIP TO A SEAT FRAME

(71) Applicant: Toyota Boshoku America, Inc., Novi, MI (US)

(72) Inventors: Alice Knoebel, Royal Oak, MI (US); Blair Kinsman, Guelph (CA); Eric Gaudreault, Elora (CA)

(73) Assignee: Toyota Boshoku America, Inc., Novi, MI (US)

( * ) Notice: Subject to any disclaimer, the term of this patent is extended or adjusted under 35 U.S.C. 154(b) by 205 days.

(21) Appl. No.: 15/201,756

(22) Filed: Jul. 5, 2016

(65) Prior Publication Data

US 2017/0008476 A1 Jan. 12, 2017

Related U.S. Application Data

(60) Provisional application No. 62/189,239, filed on Jul. 7, 2015.

(51) Int. Cl.
*B60R 21/201* (2011.01)
*B60R 21/207* (2006.01)
*B60R 21/20* (2011.01)
*B60R 21/216* (2011.01)

(52) U.S. Cl.
CPC ............ *B60R 21/207* (2013.01); *B60R 21/20* (2013.01); *B60R 21/201* (2013.01); *B60R 21/216* (2013.01)

(58) Field of Classification Search
CPC ... B60R 21/201; B60R 21/207; B60R 21/216; B60R 21/20; B60R 2021/23146
See application file for complete search history.

(56) References Cited

U.S. PATENT DOCUMENTS

| 5,791,683 | A | * | 8/1998 | Shibata | ................. B60R 21/201 280/730.1 |
| 6,042,147 | A | | 3/2000 | Nishijima et al. | |
| 6,231,068 | B1 | | 5/2001 | White, Jr. et al. | |
| 6,612,610 | B1 | * | 9/2003 | Aoki | ..................... B60R 21/201 280/730.2 |
| 7,523,958 | B2 | | 4/2009 | Jang et al. | |
| 7,669,883 | B2 | | 3/2010 | Giddings et al. | |
| 7,677,594 | B2 | | 3/2010 | Hazlewood et al. | |

(Continued)

FOREIGN PATENT DOCUMENTS

| JP | 2000-313302 A | 11/2000 |
| JP | 2007-45262 A | 2/2007 |

(Continued)

OTHER PUBLICATIONS

Machine translation of JP200704562A (Year: 2018).*

(Continued)

*Primary Examiner* — Barry Gooden, Jr.
(74) *Attorney, Agent, or Firm* — Carlson, Gaskey & Olds, P.C.

(57) ABSTRACT

An airbag bracket assembly includes a seat frame including a stud hole, a first bracket, and a second bracket including a bracket hole. The first bracket is located on one side of the seat frame, and the second bracket is located on an opposing side of the seat frame. A fastener is attached to the first bracket. The fastener is received in the stud hole and the bracket hole. A method is also disclosed.

17 Claims, 1 Drawing Sheet

(56) References Cited

U.S. PATENT DOCUMENTS

| | | | |
|---|---|---|---|
| 7,871,103 B2 | 1/2011 | Torii | |
| 8,152,197 B2 | 4/2012 | Taguchi et al. | |
| 8,505,961 B2 | 8/2013 | Jakobsson | |
| 8,602,445 B2 | 12/2013 | Williams et al. | |
| 8,636,300 B2 | 1/2014 | Jaconelli et al. | |
| 8,690,187 B2 * | 4/2014 | Fukawatase | B60R 21/207 280/730.2 |
| 8,807,594 B2 | 8/2014 | Mizobata | |
| 8,998,248 B2 | 4/2015 | Shankar et al. | |
| 9,321,417 B1 * | 4/2016 | Lepper | B60R 21/213 |
| 9,855,910 B2 * | 1/2018 | Fischer | B60R 21/213 |
| 9,914,422 B2 * | 3/2018 | Yoo | B60R 21/207 |
| 2003/0222435 A1 * | 12/2003 | Schmidt | B60R 21/201 280/728.2 |
| 2007/0063490 A1 * | 3/2007 | Minamikawa | B60R 21/201 280/728.2 |
| 2009/0001783 A1 | 1/2009 | Hazlewood et al. | |
| 2010/0001499 A1 * | 1/2010 | Heigl | B60R 21/201 280/743.1 |
| 2011/0140396 A1 * | 6/2011 | Urabe | B60R 21/207 280/728.2 |
| 2012/0091695 A1 * | 4/2012 | Richez | B60R 21/207 280/729 |
| 2013/0214515 A1 | 8/2013 | Malmenstam et al. | |
| 2014/0062069 A1 * | 3/2014 | Fukawatase | B60R 21/23138 280/730.2 |
| 2015/0291119 A1 * | 10/2015 | Noma | B60R 21/201 280/728.2 |
| 2018/0093633 A1 * | 4/2018 | Komura | B60N 2/643 |
| 2018/0093636 A1 * | 4/2018 | Komura | B60R 21/2338 |
| 2018/0297549 A1 * | 10/2018 | Kobayashi | B60R 21/233 |

FOREIGN PATENT DOCUMENTS

| | | |
|---|---|---|
| JP | 2013-100045 | 5/2013 |
| WO | 2014/036197 A2 | 3/2014 |

OTHER PUBLICATIONS

International Search Report and Written Opinion for International Application No. PCT/US2016/040940 dated Oct. 7, 2016.
International Preliminary Report on Patentability for PCT Application No. PCT/US2016/040940 dated Jan. 18, 2018.

* cited by examiner

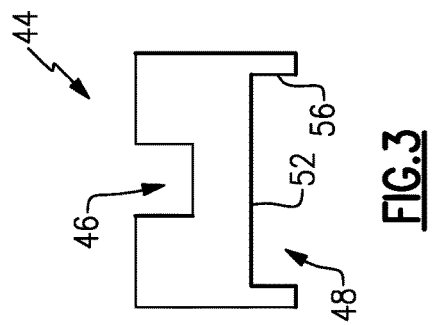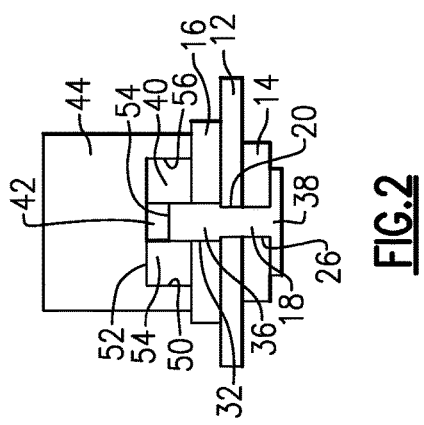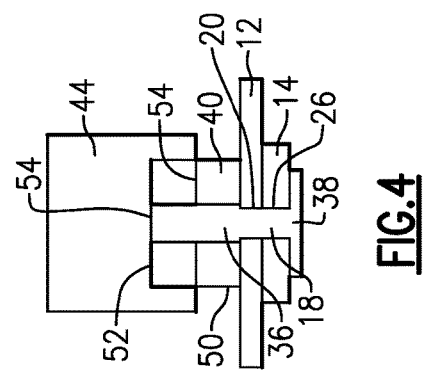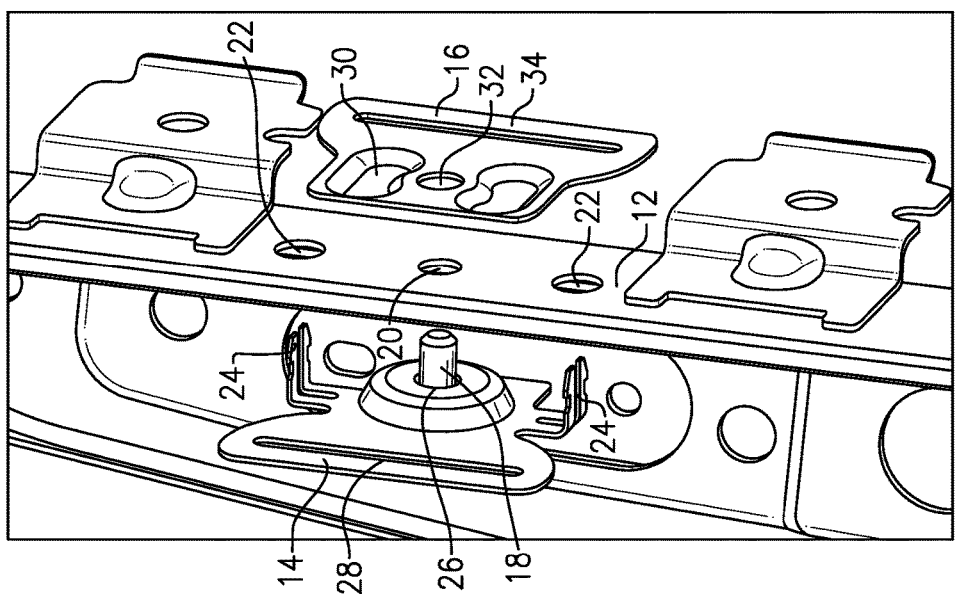

MISTAKE PROOF BRACKETS FOR INSTALLATION OF SEAT TRIM COVER AIRBAG STRIP TO A SEAT FRAME

REFERENCE TO RELATED APPLICATION

This application claims priority to U.S. Provisional Application No. 62/189,239 filed on Jul. 7, 2015.

BACKGROUND OF THE INVENTION

Airbag strap brackets are attached to a metal seat frame by a stud. The stud is attached on one side of the seat frame, and two airbag strap brackets are attached by the stud on the opposite side of the seat frame. Two straps pass through slots in the airbag strap brackets to direct the deployment of the airbag.

When attaching the airbag strap brackets to the seat frame, it is possible that a seat assembly operator could forget to install one or more of the airbag strap brackets. If this occurs, it can be difficult to detect because the brackets are hidden from view in a fully assembled seat.

In a prior system, a torque monitoring system has been used to determine if one or more airbag strap brackets are missing. However, the torque monitoring system can only determine an error if the nut that attaches the airbag strap brackets is not installed. The prior system cannot detect if one or both of the airbag strap brackets are not installed.

SUMMARY OF THE INVENTION

In a featured embodiment, an airbag bracket assembly includes a seat frame including a stud hole, a first bracket, and a second bracket including a bracket hole. The first bracket is located on one side of the seat frame, and the second bracket is located on an opposing side of the seat frame. A fastener is attached to the first bracket. The fastener is received in the stud hole and the bracket hole.

In another embodiment according to the previous embodiment, the first bracket and the second bracket are made of metal.

In another embodiment according to any of the previous embodiments, the seat frame includes a first hole and a second hole each located on opposing sides of the stud hole. The first bracket includes a first tab and a second tab each on opposing sides of the fastener. The first tab is received in the first hole of the seat frame and the second tab is received in the second hole of the seat frame to prevent rotation of the first bracket.

In another embodiment according to any of the previous embodiments, the first bracket includes a first slot and the second bracket includes a second slot that each receive a strap of an airbag.

In another embodiment according to any of the previous embodiments, the second bracket includes a first recess and a second recess that provide stiffness and thickness to the second bracket. The first recess and the second recess are on opposing sides of the bracket hole.

In another embodiment according to any of the previous embodiments, the fastener includes a threaded body and a head. The threaded body of the fastener is received in the stud hole of the seat frame and the bracket hole of the second bracket, and the head contacts the first bracket.

In another embodiment according to any of the previous embodiments, a threaded nut is attached to the threaded body of the fastener to secure the first bracket and the second bracket to the seat frame, and the threaded nut contacts the second bracket.

In another featured embodiment, an airbag bracket assembly includes a seat frame including a stud hole. The seat frame includes a first hole and a second hole each located on opposing sides of the stud hole. The first bracket includes a first tab and a second tab each on opposing sides of the fastener. The first tab is received in the first hole of the seat frame and the second tab is received in the second hole of the seat frame to prevent rotation of the first bracket. A second bracket includes a bracket hole. The first bracket is located on one side of the seat frame, and the second bracket is located on an opposing side of the seat frame. A fastener is attached to the first bracket. The fastener includes a threaded body and a head. The threaded body of the fastener is received in the stud hole of the seat frame and the bracket hole of the second bracket, and the head contacts the first bracket. A threaded nut is attached to the threaded body of the fastener to secure the first bracket and the second bracket to the seat frame, wherein the threaded nut contacts the second bracket.

In another embodiment according to the previous embodiment, the first bracket and the second bracket are made of metal.

In another embodiment according to any of the previous embodiments, the first bracket includes a first slot and the second bracket includes a second slot that each receive a strap of an airbag.

In another embodiment according to any of the previous embodiments, the second bracket includes a first recess and a second recess that provide stiffness and thickness to the second bracket. The first recess and the second recess are on opposing sides of the bracket hole.

In another featured embodiment, a method of determining if an airbag bracket assembly is assembly properly includes locating a first bracket on a first side of a seat frame and locating a second bracket on a second opposing side of the seat frame. The method includes the steps of poisoning a through a stud hole in the seat frame and the bracket hole in the second bracket. A socket is employed to attach a threaded nut to the fastener to secure the airbag bracket assembly together.

In another embodiment according to the previous embodiment, includes the steps of inserting a first tab and a second tab of the first bracket into a first hole and a second hole, respectively, of the seat frame. The first hole and the second hole are each located on opposing sides of the stud hole.

In another embodiment according to any of the previous embodiments, the fastener includes a threaded body and a head. The threaded body of the fastener is received in the stud hole of the seat frame and the bracket hole of the second bracket. The head contacts the first bracket. The threaded nut contacts the second bracket.

In another embodiment according to any of the previous embodiments, the socket includes a socket portion having a socket upper surface and socket walls and the threaded nut includes a nut upper surface and nut walls.

In another embodiment according to any of the previous embodiments, the socket upper surface of the socket engages or is proximate to the nut upper surface of the threaded nut and the socket walls of the socket engage the nut walls of the threaded nut when the airbag bracket assembly is properly assembled, and rotation of the socket rotates the threaded nut to secure the airbag bracket assembly together.

In another embodiment according to any of the previous embodiments, the socket upper surface of the socket engages a surface of a threaded body of the fastener when the airbag bracket assembly is improperly assembled, and the socket walls of the socket do not engage the nut walls of the threaded nut to prevent assembly of the airbag bracket assembly.

BRIEF DESCRIPTION OF THE DRAWINGS

Other advantages of the present invention can be understood by reference to the following detailed description when considered in connection with the accompanying drawings wherein:

FIG. 1 illustrates a perspective exploded view of a seat frame and two airbag strap brackets;

FIG. 2 illustrates a cross-sectional side view of the airbag strap brackets installed on the seat frame and installed correctly;

FIG. 3 illustrates a socket of a custom tool used to reach torque and determine proper assembly; and FIG. 4 illustrates a cross-sectional side view of the airbag strap brackets installed on the seat frame and installed incorrectly.

DETAILED DESCRIPTION OF THE PREFERRED EMBODIMENTS

FIG. 1 illustrates an assembly 10 including a seat frame 12, a first airbag strap bracket 14 and a second airbag strap bracket 16. The first airbag strap bracket 14 and the second airbag strap bracket 16 are made of metal. A stud 18 is attached to the first airbag strap bracket 14. In one example, the stud 18 is attached to the first airbag strap bracket 14 by welding, staking or riveting. The seat frame 12 includes a stud hole 20 that receives the stud 18. The seat frame 12 also includes a holes 22 on each opposing side of the stud hole 20.

The first airbag strap bracket 14 includes tabs 24 that extend towards the seat frame 12. The tabs 24 are each received in one of the holes 22 to prevent rotation of the first airbag strap bracket 14 and are located on opposing sides of the second airbag strap bracket 16 once assembled. The first airbag strap bracket 14 includes a hole 26 in which the stud 18 is located. The first airbag strap bracket 14 includes a longitudinal slot 28 that receives a strap (not shown) that secures an airbag (not shown).

The second airbag strap bracket 16 includes recessed areas 30 that provide stiffness and add thickness to the second airbag strap bracket 16. The second airbag strap bracket 16 includes a hole 32 that receives the stud 18. In one example, the second airbag strap bracket 16 includes two recessed areas 30, and one recessed area 30 is located on each opposing side of the hole 32. The second airbag strap bracket 16 also includes a longitudinal slot 34 that receives a strap (not shown) that also secures the airbag.

FIG. 2 illustrates the assembly 10 when properly assembled. The stud 18 includes a threaded body 36 and a head 38. The threaded body 36 of the stud 18 is received in the hole 26 of the first airbag strap bracket 14, and the head 38 contacts the first airbag strap bracket 14. The threaded body 36 of the stud 18 is located in the stud hole 20 of the seat frame 12 and the hole 32 of the second airbag strap bracket 16. Once assembled, an internally threaded nut 40 is placed on the threaded body 36 of the stud 18 and rotated in place to secure the assembly 10 together. The internally threaded nut 40 includes a passage 42 that extends through an entirety of the threaded nut 40. That is, the threaded nut 40 is not a cap nut. In one example, the threaded nut 40 is a hex nut.

As further shown in FIG. 3, a custom tool including a socket 44 is used to determine if the assembly 10 is assembled properly and to determine if torque can be reached. The socket 44 includes a recess 46 that receives a tool (not shown) and a socket portion 48 that engages an external surface 50 of the internally threaded nut 40. When the assembly 10 is properly assembled, an upper surface 52 of the socket portion 48 engages or is proximate to a surface 54 of the internally threaded nut 40 (or bottoms out on the internally threaded nut 40), allowing an internal wall 56 of the socket portion 48 to engage the external surface 50 of the internally threaded nut 40. The internally threaded nut 40 surrounds the threaded body 36 of the stud 18. In one example, the internally threaded nut 40 surrounds a surface 54 of the threaded body 36 that is opposite to the head 38. As the socket 44 is turned by the custom tool, torque can be reached, indicating that the assembly 10 is properly assembly with both airbag strap brackets 14 and 16 properly installed. Once assembled, the first airbag strap bracket 14 and the second airbag strap bracket 16 are located on opposing sides of the seat frame 12.

FIG. 4 illustrates the assembly 10 when improperly assembled, and the second airbag strap bracket 16 is missing from the assembly 10. The threaded body 36 of the stud 18 is received in the hole 26 of the first airbag strap bracket 14, and the first airbag strap bracket 14 contacts the head 38. The threaded body 36 of the stud 18 passes through the stud hole 20 of the seat frame 12. The second airbag strap bracket 16 is missing from the assembly 10. The internally threaded nut 40 is placed on the assembly 10. When the assembly 10 is improperly assembled in this manner, the upper surface 52 of the socket portion 48 of the socket 44 bottoms out on the surface 54 of the threaded body 36 of the stud 18, preventing the internal wall 56 of the socket portion 48 from engaging the external surface 50 of the internally threaded nut 40. The torque cannot be reached, indicating that the assembly 10 is not properly installed and that one of the airbag strap brackets 14 and 16 are missing, preventing improper assembly and installation. This allows the operator to then fix the issue and properly install the components.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An airbag bracket assembly comprising:
a seat frame including a stud hole;
a first airbag strap bracket that directly contacts the seat frame;
a second airbag strap bracket including a bracket hole, wherein the second airbag strap bracket directly contacts the seat frame, the first airbag strap bracket is located on one side of the seat frame, and the second airbag strap bracket is located on an opposing side of the seat frame; and
a fastener attached to the first airbag strap bracket, wherein the fastener is received in the stud hole and the bracket hole.

2. The airbag bracket assembly as recited in claim 1 wherein the first airbag strap bracket and the second airbag strap bracket are made of metal.

3. The airbag bracket assembly as recited in claim 1 wherein the seat frame includes a first hole and a second hole each located on opposing sides of the stud hole, the first airbag strap bracket includes a first tab and a second tab each on opposing sides of the fastener, and the first tab is received in the first hole of the seat frame and the second tab is received in the second hole of the seat frame to prevent rotation of the first airbag strap bracket.

4. The airbag bracket assembly as recited in claim 1 wherein the first airbag strap bracket includes a first slot and the second airbag strap bracket includes a second slot that each receive a strap of an airbag.

5. The airbag bracket assembly as recited in claim 1 wherein the fastener includes a threaded body and a head, and the threaded body of the fastener is received in another bracket hole of the first airbag strap bracket, the stud hole of the seat frame, and the bracket hole of the second airbag strap bracket, and the head contacts the first airbag strap bracket.

6. The airbag bracket assembly as recited in claim 5 wherein a threaded nut is attached to the threaded body of the fastener to secure the first airbag strap bracket and the second airbag strap bracket to the seat frame, and the threaded nut contacts the second airbag strap bracket.

7. An airbag bracket assembly comprising:
a seat frame including a stud hole;
a first airbag strap bracket;
a second airbag strap bracket including a bracket hole, wherein the first airbag strap bracket is located on one side of the seat frame, the second airbag strap bracket is located on an opposing side of the seat frame, the second airbag strap bracket includes a first recessed area and a second recessed area that provide stiffness and thickness to the second airbag strap bracket, and the first recessed area and the second recessed area are on opposing sides of the bracket hole; and
a fastener attached to the first airbag strap bracket, wherein the fastener is received in the stud hole and the bracket hole.

8. An airbag bracket assembly comprising:
a seat frame including a stud hole, and the seat frame includes a first hole and a second hole each located on opposing sides of the stud hole;
a first airbag strap bracket that directly contacts the seat frame, wherein the first airbag strap bracket includes a first tab and a second tab each on opposing sides of a fastener, and the first tab is received in the first hole of the seat frame and the second tab is received in the second hole of the seat frame to prevent rotation of the first airbag strap bracket;
a second airbag strap bracket that directly contacts the seat frame, wherein the second airbag strap bracket includes a bracket hole, wherein the first airbag strap bracket is located on one side of the seat frame, and the second airbag strap bracket is located on an opposing side of the seat frame;
the fastener attached to the first airbag strap bracket, wherein the fastener includes a threaded body and a head, and the threaded body of the fastener is received in the stud hole of the seat frame and the bracket hole of the second airbag strap bracket, and the head contacts the first airbag strap bracket; and
a threaded nut attached to the threaded body of the fastener to secure the first airbag strap bracket and the second airbag strap bracket to the seat frame, wherein the threaded nut contacts the second airbag strap bracket.

9. The airbag bracket assembly as recited in claim 8 wherein the first airbag strap bracket and the second airbag strap bracket are made of metal.

10. The airbag bracket assembly as recited in claim 8 wherein the first airbag strap bracket includes a first slot and the second airbag strap bracket includes a second slot that each receive a strap of an airbag.

11. An airbag bracket assembly comprising:
a seat frame including a stud hole, and the seat frame includes a first hole and a second hole each located on opposing sides of the stud hole;
a first airbag strap bracket including a first tab and a second tab each on opposing sides of a fastener, and the first tab is received in the first hole of the seat frame and the second tab is received in the second hole of the seat frame to prevent rotation of the first airbag strap bracket;
a second airbag strap bracket including a bracket hole, wherein the first airbag strap bracket is located on one side of the seat frame, and the second airbag strap bracket is located on an opposing side of the seat frame, wherein the second airbag strap bracket includes a first recessed area and a second recessed area that provide stiffness and thickness to the second airbag strap bracket, and the first recessed area and the second recessed area are on opposing sides of the airbag strap bracket hole;
the fastener attached to the first airbag strap bracket, wherein the fastener includes a threaded body and a head, and the threaded body of the fastener is received in the stud hole of the seat frame and the bracket hole of the second airbag strap bracket, and the head contacts the first airbag strap bracket; and
a threaded nut attached to the threaded body of the fastener to secure the first airbag strap bracket and the second airbag strap bracket to the seat frame, wherein the threaded nut contacts the second airbag strap bracket.

12. A method of determining if an airbag bracket assembly is assembled properly, the method comprising the steps of:
locating a first airbag strap bracket on a first side of a seat frame, wherein the first airbag strap bracket directly contacts the seat frame;
locating a second airbag strap bracket on a second opposing side of the seat frame, wherein the second airbag bracket directly contacts the seat frame;
positioning a fastener through a stud hole in the seat frame and an airbag strap bracket hole in the second airbag strap bracket; and
employing a socket to attach a threaded nut to the fastener to secure the airbag bracket assembly together.

13. The method as recited in claim 12 including the steps of inserting a first tab and a second tab of the first airbag strap bracket into a first hole and a second hole, respectively, of the seat frame, wherein the first hole and the second hole are each located on opposing sides of the stud hole.

14. The method as recited in claim 12 wherein the fastener includes a threaded body and a head, and the threaded body of the fastener is received in the stud hole of the seat frame and the bracket hole of the second airbag strap bracket, the head contacts the first airbag strap bracket, and the threaded nut contacts the second airbag strap bracket.

15. The method as recited in claim 12 wherein the socket includes a socket portion having a socket upper surface and socket walls and the threaded nut includes a nut upper surface and nut walls.

16. The method as recited in claim 15 wherein the socket upper surface of the socket engages or is proximate to the nut upper surface of the threaded nut, and the socket walls of the socket engage the nut walls of the threaded nut when the airbag bracket assembly is properly assembled, and rotation of the socket rotates the threaded nut to secure the airbag bracket assembly together.

17. The method as recited in claim 15 wherein the socket upper surface of the socket engages a surface of a threaded body of the fastener when the airbag bracket assembly is improperly assembled, and the socket walls of the socket do not engage the nut walls of the threaded nut to prevent assembly of the airbag bracket assembly.

* * * * *